US012265409B1

(12) United States Patent
Hisano

(10) Patent No.: US 12,265,409 B1
(45) Date of Patent: Apr. 1, 2025

(54) RADIATION TOLERANT BANDGAP REFERENCE

(71) Applicant: Frontgrade Technologies Inc., Arlington, VA (US)

(72) Inventor: Shinichi Hisano, Colorado Springs, CO (US)

(73) Assignee: Frontgrade Technologies Inc., Arlington, VA (US)

( * ) Notice: Subject to any disclaimer, the term of this patent is extended or adjusted under 35 U.S.C. 154(b) by 174 days.

(21) Appl. No.: 18/148,649

(22) Filed: Dec. 30, 2022

(51) Int. Cl.
*G05F 1/56* (2006.01)
*G05F 3/30* (2006.01)

(52) U.S. Cl.
CPC .................................... *G05F 1/56* (2013.01)

(58) Field of Classification Search
CPC .................................... G05F 1/56; G05F 3/30
See application file for complete search history.

(56) References Cited

U.S. PATENT DOCUMENTS 4,151,484 A * 4/1979 Robe .................. H03F 3/45587 330/296
5,148,099 A * 9/1992 Ong ......................... G05F 3/30 323/907

FOREIGN PATENT DOCUMENTS

CN 107870648 A * 4/2018 ............ G05F 1/565
CN 117369582 A * 1/2024
KR 102666510 B1 * 5/2024

* cited by examiner

*Primary Examiner* — Sisay G Tiku
(74) *Attorney, Agent, or Firm* — Alston & Bird LLP

(57) ABSTRACT

Systems, apparatuses, and methods that compensate for total ionizing doses and intrinsic base currents in transistors of a bandgap reference circuit are provided. A compensation circuit can include a compensation transistor with a size and one or more bias conditions that are based at least in part on a respective bipolar transistor of a bandgap reference circuit. The compensation circuit can include an operational amplifier that is configured to: (i) set a base-collector voltage of the compensation transistor to zero; and (ii) provide a compensation base current to a base terminal of the compensation transistor that is representative of at least a radiation-induced current transistor or an intrinsic base current for the respective bipolar transistor. A bandgap reference circuit can be augmented with one or more compensation circuits to accommodate for a total ionizing dose and/or an intrinsic base current for one or more transistors of the bandgap reference circuit.

19 Claims, 7 Drawing Sheets

RADIATION TOLERANT BANDGAP REFERENCE

TECHNOLOGICAL FIELD

Example embodiments of the present invention relate generally to integrated circuits, and more particularly to radiation tolerant bandgap references.

BACKGROUND

In integrated circuit design, bandgap reference circuits are used as independent voltage references to produce a fixed voltage regardless of power supply variation, temperature changes, or other factors. Conventional bandgap reference circuits are designed to accommodate for temperature and power supply variations, but do not account for the influence that accumulated radiation, or total ionizing dose ("TID"), may have on the reliability on the output of the bandgap reference circuit. TID can negatively impact the performance of electronics including bandgap reference circuits and can be especially relevant in high radiation environments such as space.

FIG. 1 is a schematic diagram of an example bandgap reference circuit 100 in the prior art. FIG. 1 illustrates one example circuit of a plurality of different types of conventional bandgap reference circuits for illustrative purposes. The bandgap reference circuit 100 includes a negative-positive-negative ("NPN") based bandgap reference circuit with a proportional to absolute temperature ("PTAT") current generated therein.

The bandgap reference circuit 100 can include at least two diode connected NPN transistors. The at least two diode connected NPN transistors, for example, can include a first transistor 102, a second transistor 104, and/or a third transistor 106. Each transistor can include a type of bipolar transistor with three layers and is controlled by a current of the bandgap reference circuit 100. In some embodiments, the first transistor 102 and the second transistor 104 can be diode connected NPN transistors with an emitter ratio of eight to one. The ratio can be any ratio depending on the circumstances and can vary based on various configuration/implementation details for the bandgap reference circuit 100. The emitter ratio, for example, can be eight to one, two to one, four to one, ten to one, and/or the like depending on the embodiment.

The bandgap reference circuit 100 can include a power supply and a plurality of equally sized current sources. The power supply can include an operational amplifier 108 and a supply 109. The plurality of current sources can include a first current source 110, a second current source 112, and/or a third current source 114. Each current source can include a transistor such as, for example, a metal-oxide-semiconductor field-effect transistor ("MOSFET"). In some embodiments, each current source can include a P-type MOSFET. The bandgap reference circuit 100 can include a common gate node 116 (denoted as NPG in the FIG. 1) for each of the current sources. The operational amplifier 108 can create a loop with equal size current sources (e.g., the first current source 110 and the second current source 112) that forces the same current 118 (denoted as I) to the first transistor 102 (denoted as Q0) and to the second transistor 104 (denoted as Q1). The proportion of the bandgap reference circuit 100 is proportional to the absolute temperature. This is identified by a voltage drop across the resistor 122 (denoted as Rpt).

The bandgap reference circuit 100 scales base-emitter area of the first transistor 102 and the second transistor 104 and biases each transistor at the same collector current in order to produce base emitter voltages, the difference of which is proportional to absolute temperature. In this way, the bandgap reference circuit 100 can produce a temperature independent voltage reference by adding a voltage proportional to absolute temperature across a voltage drop across a resistor Rbg and a base-emitter voltage of 106 (denoted as Q2) which has a negative temperature coefficient.

The bandgap reference circuits 100 does not accommodate for other variations in current such as those due to radiation and/or the intrinsic base currents for bipolar transistors. For example, the bandgap reference circuit 100 does not compensation for TID. The effective increase in base current due to radiation, TID, can occur at each transistor of the bandgap reference circuit and, for explanatory purposes, is illustrated as a first radiation current increase 124 (denoted as IR0) for the first transistor 102, a second radiation current increase 126 (denoted as IR1) for the second transistor 104, and/or a third radiation current increase 128 (denoted as IR2) for the third transistor 106.

The collector current (denoted as Ic) and base current (denoted as Ib) of a bipolar transistor can be expressed by the following Ebers Moll equations:

$$Ic = Is\cdot\left[\left(e^{V_{BE}/Vt} - e^{V_{BC}/Vt}\right)\cdot\left(1 - \frac{V_{BC}}{V_A}\right) - \frac{1}{\beta_R}\cdot\left(e^{V_{BC}/Vt} - 1\right)\right] \quad (1)$$

$$I_B = I_S\cdot\left[\frac{1}{\beta_F}\cdot\left(e^{V_{BE}/Vt} - 1\right) + \frac{1}{\beta_R}\cdot\left(e^{V_{BC}/Vt} - 1\right)\right] \quad (2)$$

In the above equations, $I_S$ is the saturation current, $V_{BE}$ is the base-emitter voltage, Vt is the thermal voltage, $V_{BC}$ is the base-collector voltage, $V_A$ is the Early voltage, $\beta_R$ is the reverse current gain, and $\beta_F$ is the forward current gain.

The first transistor 102 and the second transistor 104 can be bipolar transistors that can be diode connected and in the forward bias region of operation making: $V_{BC}=0$ and $V_{BE}$~0.5V to 0.65V. The thermal voltage can be given by kT/q, where k is Boltzmann constant, Tis the absolute temperature, and q is the charge of an electron, giving rise to Vt~26 mV at 300K (26 mV at room temp). Therefore, $e^{V_{BE}/Vt} \gg 1$. Equations (1) and (2) can be simplified to:

$$Ic = Is\cdot e^{V_{BE}/Vt} \quad (3)$$

$$I_B = \frac{Is}{\beta_F}\cdot e^{V_{BE}/Vt} \quad (4)$$

Using these equations, the current 118 for the bandgap reference circuit 100 of FIG. 1, can be found by:

$$V_{BE0} + I\cdot Rpt = V_{BE1} \quad (5)$$

$$V_{BE0} = Vt\cdot\ln(I_{C0}/I_{S0}) \quad (6)$$

$$V_{BE1} = Vt\cdot\ln(I_{C1}/I_{S1}) \quad (7)$$

$$I = I_{C0} + I_{B0} + I_{R0} \quad (8)$$

$$I = I_{C1} + I_{B1} + I_{R1} \quad (9)$$

$$I\cdot Rpt = Vt\cdot\ln\left[\frac{8\cdot(I - I_{B1} - I_{R1})}{I - I_{B0} - I_{R0}}\right] \quad (10)$$

This takes into account the specific emitter ratio of the bandgap reference circuit 100 such that, $I_{S0}=8\cdot I_{S1}$. The same equation can be modified according to any emitter ratio for another bandgap reference circuit.

The current 118 can be mirrored such that it flows into the series combination of Rbg and the third transistor 106 (denoted as Q2) to create a bandgap voltage 130 (denoted as VGO). The bandgap voltage 130 is measured by:

$$VGO = V_{BE2} + \frac{Rbg}{Rpt} \cdot Vt \cdot \ln\left[\frac{8 \cdot (I - I_{B1} - I_{R1})}{I - I_{B0} - I_{R0}}\right] \quad (11)$$

To generate a temperature independent constant voltage, the bandgap reference circuit 100 can be designed to add the negative temperature coefficient of $V_{BE}$ to the voltage proportional to the absolute temperature given by the second term in the right hand side of the equation (11) above. In this case, Vt is proportional to the absolute temperature (Vt=kT/q), $V_{BE2}$ can have a negative temperature coefficient that decreases as temperature increases, and $$\frac{Rbg}{Rpt} * Vt$$

can include a physical parameter dictated by the Boltzman constant. To realize the temperature independent constant voltage (e.g., bandgap voltage 130 denoted as $V_{BE2}$) the negative temperature coefficient cancels out Vt (e.g., which is proportional to absolute temperature).

The bandgap reference circuit 100 does not account for TID or the intrinsic base currents for bipolar transistors which, as shown by the above equation, can impact the accuracy of the bandgap voltage 130. As illustrated, the terms $I_{B0}$ (e.g., the first intrinsic base current), $I_{B1}$ (e.g., the second intrinsic base current), $I_{R0}$ (first radiation current increase 124) and $I_{R1}$ (second radiation current increase 126) prevent conventional circuits from realizing true temperature independent constant voltages due to variations caused by radiation and intrinsic base currents. Moreover, each of these terms is a strong function of temperature. For example, the first radiation current increase 124 and the second radiation current increase 126 can increase as a function of TID. This can cause the bandgap voltage 130 and the temperature drift of the bandgap reference circuit 100 to shift as TID increases, which is common in space applications and other high radiation environments.

Through applied effort, ingenuity, and innovation, these identified problems have been solved by developing solutions that are included in embodiments of the present disclosure, examples of which are described in detail herein.

BRIEF SUMMARY

Various embodiments described herein relate to systems, apparatuses, products, and methods that compensate for total ionizing doses and intrinsic base currents in transistors of a bandgap reference circuit at the circuit level.

In accordance with an example embodiment of the present disclosure, a compensation circuit for a bandgap reference circuit is provided. The compensation circuit includes a compensation transistor. The compensation transistor has a size and one or more bias conditions that are based at least in part on a respective bipolar transistor of the bandgap reference circuit. In addition, the compensation circuit includes a compensation operational amplifier that is configured to (i) set a base-collector voltage of the compensation transistor to zero; and (ii) provide a compensation base current to a base terminal of the compensation transistor that is representative of at least a radiation-induced current for the respective bipolar transistor.

In accordance with another example embodiment of the present disclosure a radiation tolerant bandgap reference circuit is provided. The radiation tolerant bandgap reference circuit includes a plurality of bipolar transistors and at least one compensation circuit configured to generate and provide a compensation base current to a base terminal of at least one bipolar transistor of the plurality of bipolar transistors. The compensation base current is representative of at least a radiation-induced current at the at least one bipolar transistor.

In accordance with yet another example embodiment of the present disclosure, a method of manufacturing a radiation tolerant bandgap reference circuit is provided. The method includes forming a bandgap reference circuit comprising a plurality of bipolar transistors. The plurality of bipolar transistors comprise at least a first transistor and a second transistor. The first transistor and the second transistor are diode connected negative-positive-negative (NPN) transistors with an emitter ratio of eight to one. The method includes electrically coupling a first compensation circuit to the first transistor. The first compensation circuit comprises a first compensation transistor with a first size and one or more first bias conditions that are identical to the first transistor. The method includes electrically coupling a second compensation circuit to the second transistor. The second compensation circuit comprises a second compensation transistor with a second size and one or more second bias conditions that are identical to the second transistor.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those summarized here, some of which will be further described below.

BRIEF SUMMARY OF THE DRAWINGS

Figure 1:
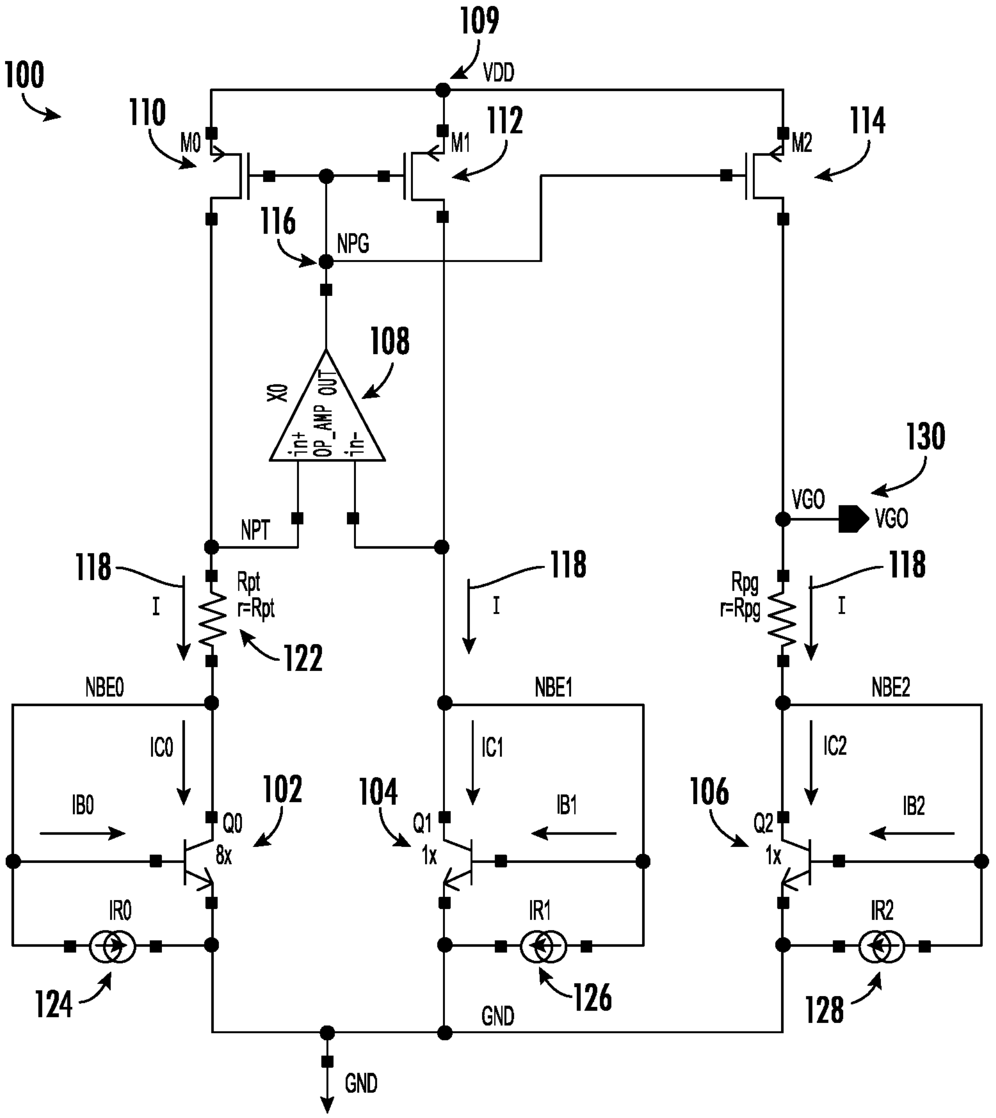
FIG. 1 PRIOR ART

Having thus described certain example embodiments of the present disclosure in general terms, reference will now be made to the accompanying drawings, which are not necessarily drawn to scale, and wherein:

FIG. 1 is a schematic diagram of an example bandgap reference circuit in the prior art.

Figure 2:
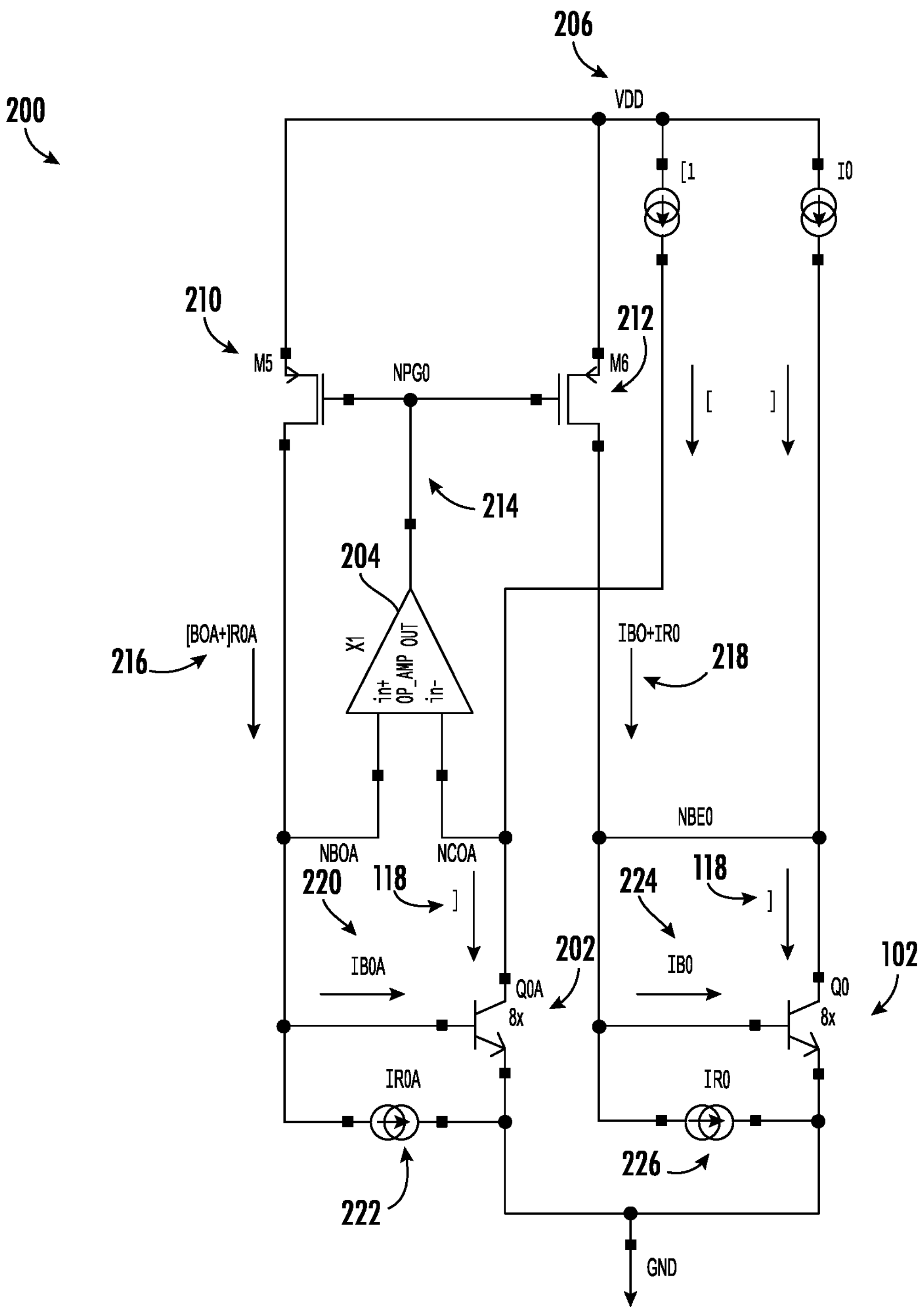
Figure 3:
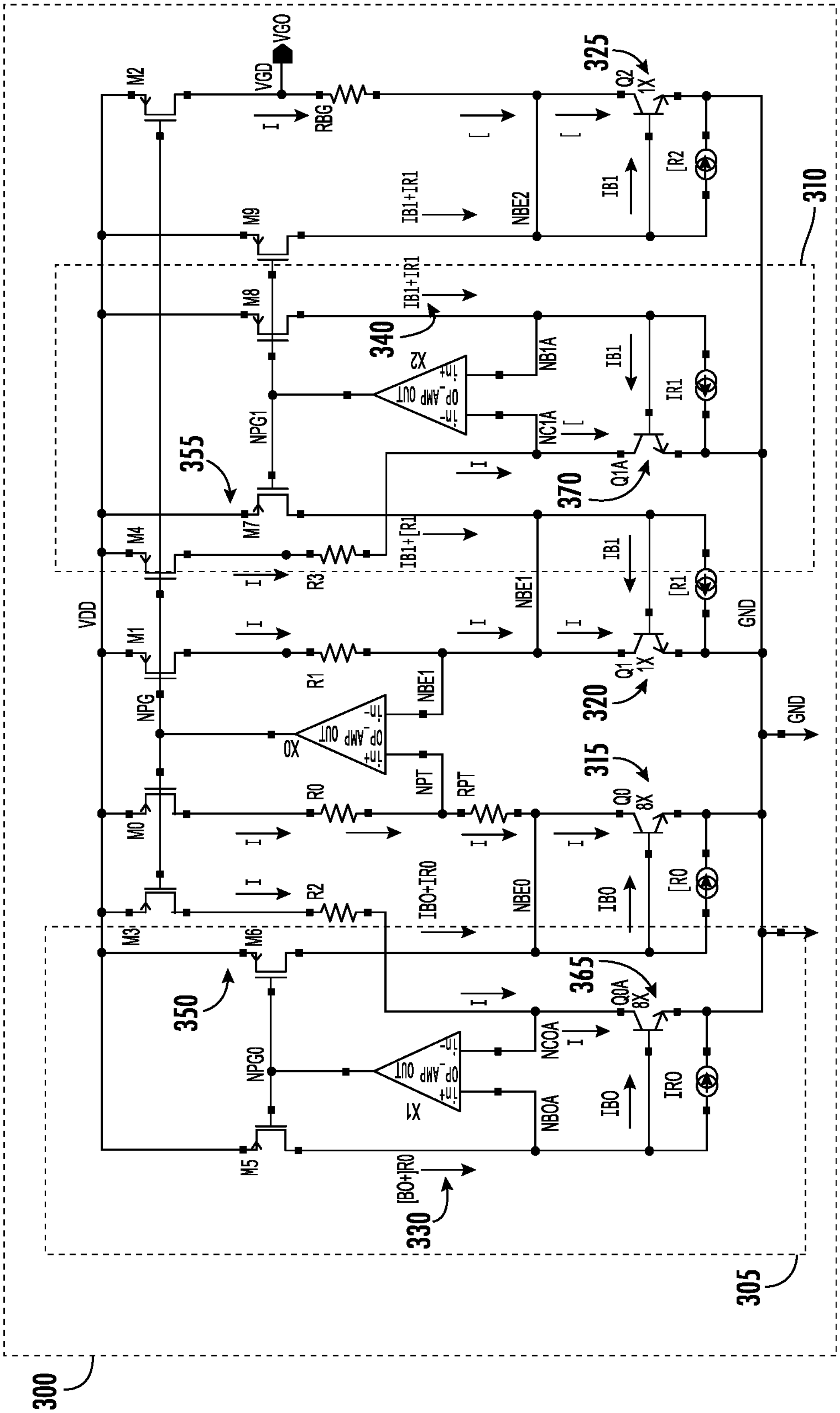
Figure 4:
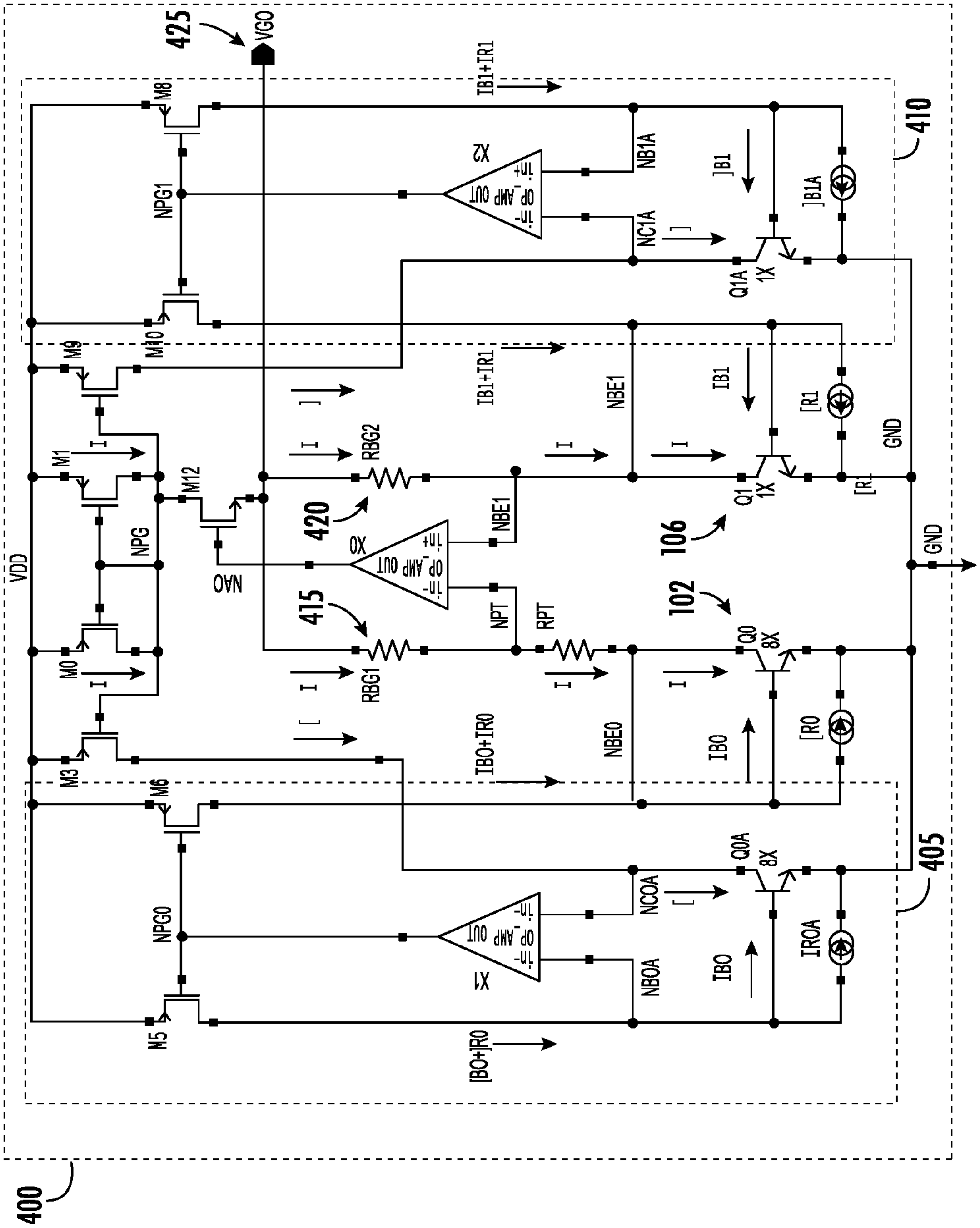
Figure 5:
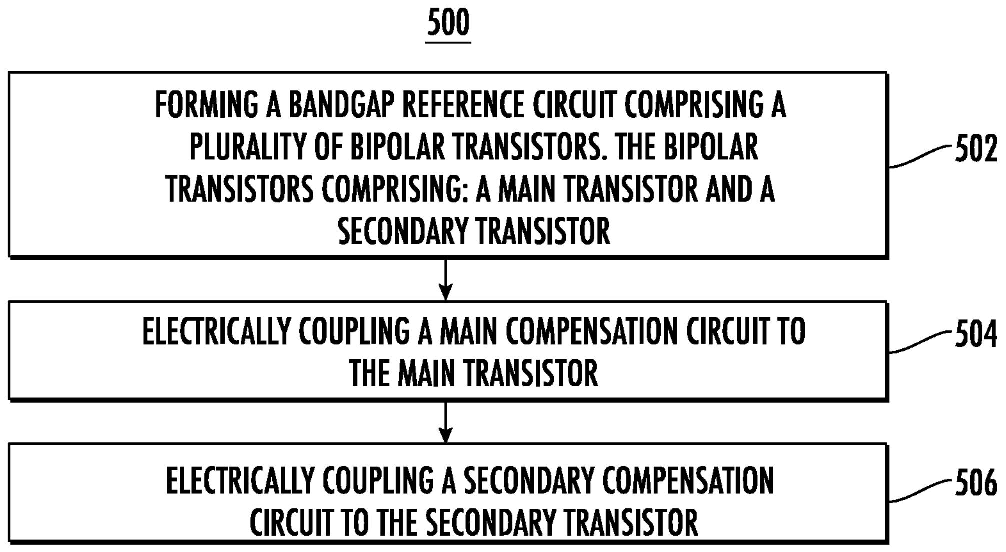

FIG. 2 is a schematic diagram of an example compensation circuit that accommodates for intrinsic base current and TID induced variations in a bandgap reference circuit in accordance with one or more embodiments of the present disclosure;

FIG. 3 is a schematic diagram of an example radiation tolerant bandgap circuit in accordance with one or more embodiments of the present disclosure;

FIG. 4 is a schematic diagram of another example radiation tolerant bandgap circuit in accordance with one or more embodiments of the present disclosure;

FIG. 5 is a flowchart according to an example method of manufacturing a radiation tolerant bandgap reference in accordance with one or more embodiments of the present disclosure.

Figure 6:
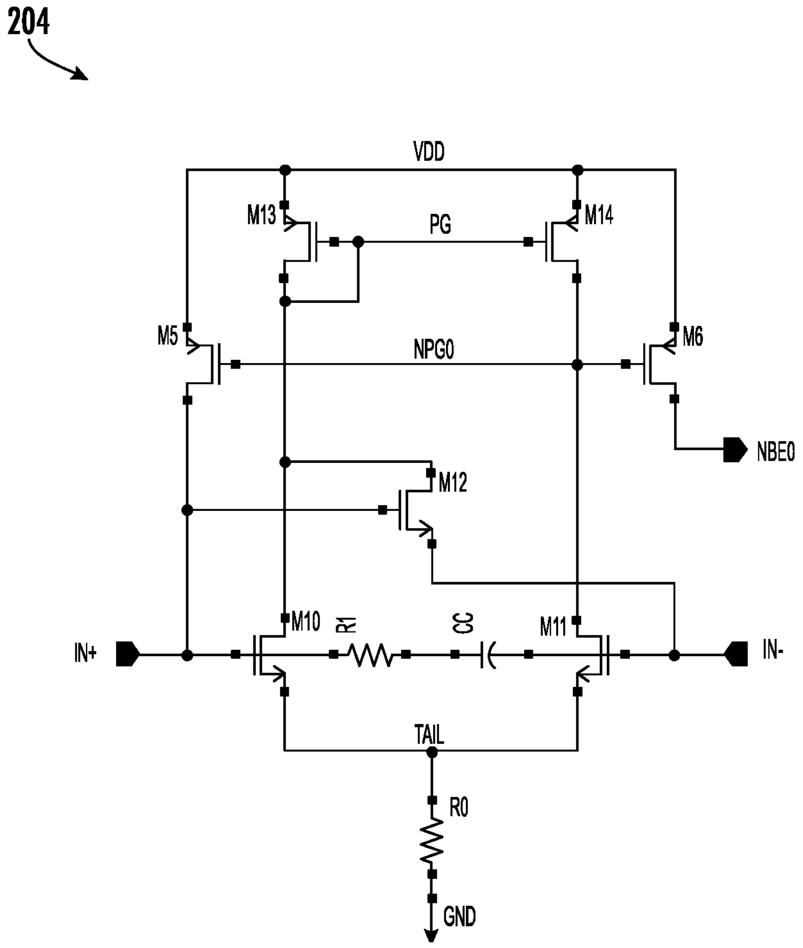
Figure 7:
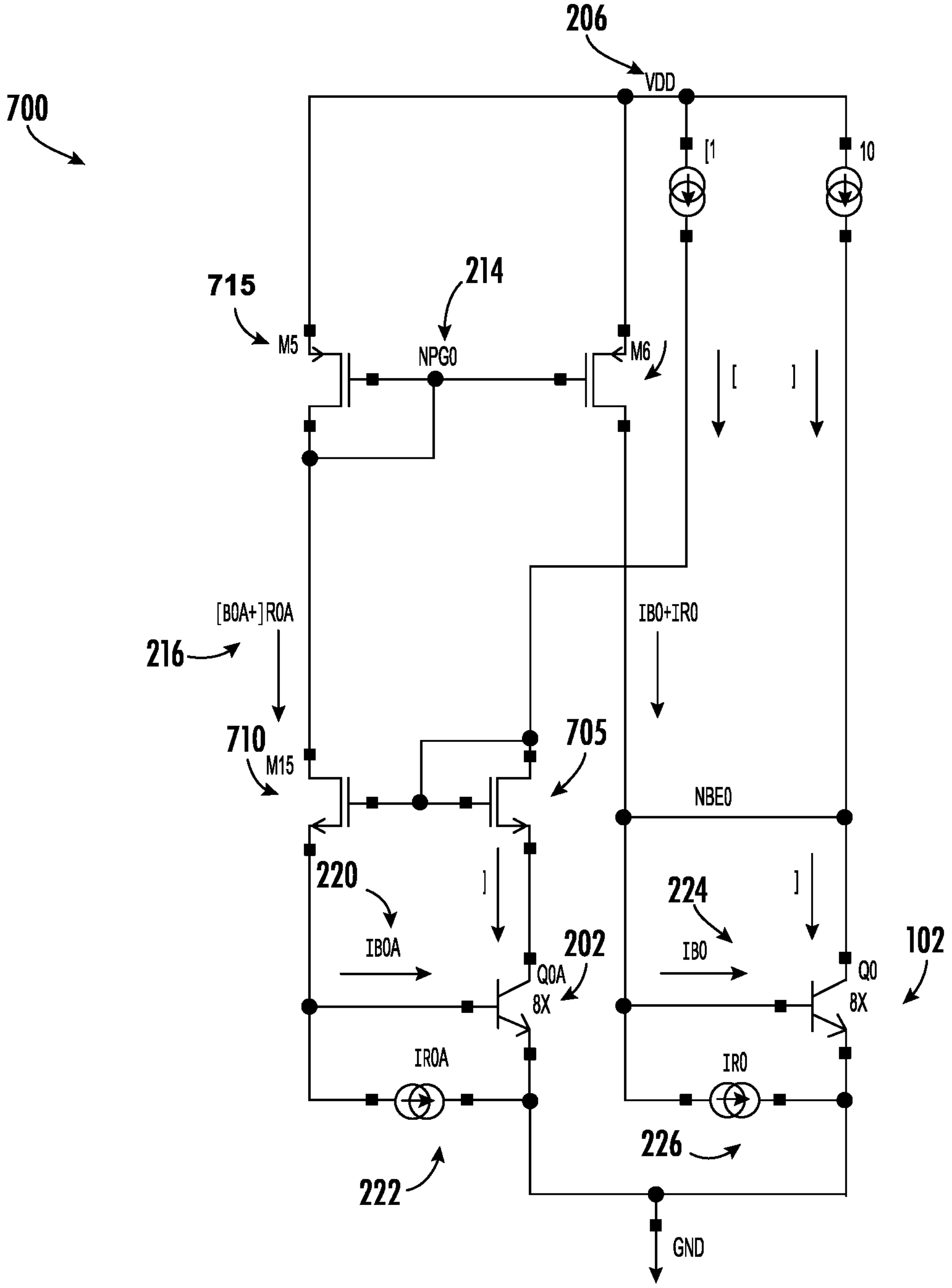

FIG. 6 is a schematic diagram of an example operational amplifier in accordance with one or more embodiments of the present disclosure; and FIG. 7 is a schematic diagram of an alternative embodiment of an example compensation circuit in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, aspects of the disclosure may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present invention are directed to improved systems, apparatuses, products, and methods for generating a radiation tolerant bandgap reference. To overcome deficiencies with conventional bandgap reference circuits, the present disclosure provides a new circuit design that supplies a current into the base node of a first, second, and/or third transistor of a bandgap reference circuit to maintain a constant collector current for the respective transistor by compensating for a shift in the current flowing into the base terminal of the transistor due to radiation and other factors such as intrinsic base current. In this way, the circuit design of the present disclosure introduces additional components at the circuit level to compensate for error terms (e.g., $I_{B0}$, $I_{B1}$, $I_{R0}$, $I_{R1}$ shown above) that negatively impact the stability of bandgap voltage. The circuit design of the present disclosure presents a bandgap voltage reference that is independent of both temperature and other external factors including TID and/or internal factors including intrinsic base currents at the circuit level.

As described herein, conventional bandgap reference circuits do not accommodate for TID or intrinsic base currents at the circuit level. In some cases, such as for non-precision type circuits, TID can be ignored resulting in slight shifts in bandgap reference voltage outputs introduced by radiation. In other cases, TID can be measured and then compensated for later at the system level. For example, TID can be measured on a sample chip or chips and characterized over time. TID compensation parameters can be developed to determine a bandgap voltage shift as a function of TID and a system level data structure (e.g., a lookup table, database, etc.) can be leveraged to calculate, at the software level, the impact of TID on bandgap reference voltage outputs. These techniques rely on post circuit activity to accommodate for circuit defects, they do not modify a circuit to negate TID impacts at the actual circuit level which results in several downsides. Moreover, such techniques rely on the assumption that a shift in a bandgap voltage as measured using a sample chip is at least partially identical to a shift in the bandgap of an actual chip used in the system, which can be misleading.

The present disclosure describes a circuit design that negates TID and intrinsic base current impacts at the circuit level which results in a number of technical improvements to electrical circuits. For example, previous techniques for addressing TID at the system level require additional overhead, can be error prone, and can rely on a priori TID information that may be inaccurate and/or not available. The impact of TID on bandgap reference circuits can vary chip-to-chip which can exacerbate each of these issues. Moreover, system level approaches to minimizing TID impacts can evaluate a plurality of system components to calculate an average TID offset which is then used to compensate for all of the system components. Broad brush approaches such as these reduce the accuracy and reliability for each of the electrical components.

By addressing TID and intrinsic base current impacts at the circuit level, as described herein, the present disclosure presents a new circuit design that eliminates system level overhead. Moreover, the new circuit design can internally compensate for variations due to TID/intrinsic base currents which can be tailored to the specific characteristics of a respective chip. Internally compensating for such variations removes the need to rely on a priori TID information that may be inaccurate, unavailable, or vary chip-to-chip. The circuit design of the present disclosure allows for the compensation of TID variations without a reliance on the approximation of the indirect TID impacts to a system. By addressing TID at the circuit-level, TID variation/intrinsic base currents need not be measured. Ultimately, this results in more reliable, stable, and precise bandgap reference circuits which can provide technical improvements to any electrical system including space applications in which TID defects are prevalent.

It should be readily appreciated that the embodiments of the systems, apparatus, and methods described herein may be configured in various additional and alternative manners in addition to those expressly described herein.

Compensation Circuit

FIG. 2 illustrates an example compensation circuit 200 that accommodates for intrinsic base current and TID induced variations in a bandgap reference circuit in accordance with one or more embodiments of the present disclosure. The example compensation circuit 200 can include a least one diode connected NPN transistor, for example, and the compensation transistor 202. The compensation transistor 202 can be connected to a respective transistor of a bandgap reference circuit. As illustrated for example purposes, the compensation transistor 202 can be connected to the first transistor 102 of the bandgap reference circuit 100. The compensation circuit 200 can include a power supply and a plurality of equally sized current sources. The power supply can include a compensation operational amplifier 204 and a supply 206. The plurality of current sources can include a first compensation current source 210 and a second compensation current source 212.

The compensation transistor 202 (denoted as Q0A) can have a size and one or more bias conditions that are based on a respective bipolar transistor of a bandgap reference circuit. For example, the compensation transistor 202 can include a type of bipolar transistor with three layers and is controlled by a current of the compensation circuit 200. The compensation transistor 202 can be a replica of the respective bipolar transistor in terms of size and bias conditions. For example, the compensation transistor can have a compensation size that is identical to a size of the respective bipolar transistor and one or more compensation bias conditions that are identical to one or more bias conditions of the respective bipolar transistor.

In some embodiments, the compensation transistor 202 can be an exact copy of the first transistor 102. The compensation transistor 202 can be a replica of the first transistor 102 in terms of size, bias conditions, and its proximity to the first transistor 102 to mimic the first transistor 102. The compensation transistor 202 can be instantiated directly next to the first transistor 102 on a radiation tolerant bandgap reference circuit so that both the first transistor 102 and the compensation transistor 202 are exposed to the same temperature and the same radiation environment. The collector current of the compensation transistor 202 can be set to the same current 118 that is provided to the first transistor 102.

The plurality of current sources can include current mirrors. A first compensation current source 210 can include a first current mirror and a second compensation current source 212 can include a second current mirror. Each component of a current mirror can include a transistor such as, for example, a MOSFET. In some embodiments, each component of a current mirror can include a P-type MOSFET. The compensation circuit 200 can include a common gate node 214 (denoted as NPG0) for each of the current sources.

The power supply can include a compensation operational amplifier 204 (denoted as X1) that can include two inputs, including one plus (denoted as NB0A) and one minus (denoted as NC0A) that are at an equal voltage when working properly. The compensation operational amplifier 204 can be configured to set a base-collector voltage of the compensation transistor 202 to zero and provide a compensation base current 216 to a base terminal of the compensation transistor 202 that is representative of at least a radiation-induced current 226 for a respective bipolar transistor such as, for example, the first transistor 102. In some embodiments, the compensation base current 216 which is equal in value to a mirrored current 218 going into the base of the first transistor 102, is representative of both the radiation-induced current 226 and the intrinsic base current 224 for the respective bipolar transistor.

The compensation operational amplifier 204 can provide the compensation base current 216 to the base terminal of the compensation transistor 202 through a drain of the first compensation current source 210. For example, the compensation operational amplifier 204 in combination with the first compensation current source 210 can provide all currents going into the base terminal of the compensation transistor 202 from the drain of the first compensation current source 210. In this way, the compensation operational amplifier 204 can operate the first compensation current source 210 to output the compensation base current 216.

The compensation operational amplifier 204 can force the base-collector voltage (denoted as $V_{BC}$) of the compensation transistor 202 to be zero. Accordingly, like the first transistor 102, the base and collector node of the compensation transistor 202 can be at the same voltage. When the loop is closed, the compensation operational amplifier 204 can drive the common gate of the first compensation current source 210 and the second compensation current source 212 such that the drain coming out of first compensation current source 210 is the same as the sum of the compensation intrinsic base current 220 (denoted as IB0A) and the compensation radiation-induced current 222 (denoted as IR0A) for the respective bipolar transistor (e.g., compensation transistor 202). In this way, the compensation base current 216 (e.g., IB0A plus IR0A) can be representative of the sum of a radiation-induced current and an intrinsic base current for a respective bipolar transistor such as, for example, the first transistor 102.

The compensation circuit 200 that is formed by the compensation transistor 202, the compensation operational amplifier 204, the first compensation current source 210 operates in such a way that the drain current of the first compensation current source 210 exactly matches the current that goes into the base of the compensation transistor 202.

The compensation circuit 200 can include a second compensation current source 212 that provides a mirrored current 218 identical to the compensation base current 216 to a respective base terminal of the respective bipolar transistor (e.g., the first transistor 102) of a bandgap reference circuit. The compensation base current 216, for example, that is supplied to the base terminal of the compensation transistor 202 can be mirrored by the second compensation current source 212 to generate the mirrored current 218. The mirrored current 218 can be provided into the base terminal of a respective bipolar transistor such as the first transistor 102. The compensation circuit 200, for example, can be linked (e.g., electrically coupled) to the bandgap reference circuit by the second compensation current source 212 that is configured to generate the mirrored current 218 based on the compensation base current 216.

The mirrored current 218 can guarantee that a collector current of the respective bipolar transistor (e.g., first transistor 102) is independent of the intrinsic base current 224 and the radiation-induced current 226 for the respective bipolar transistor. The compensation transistor 202 and the respective bipolar transistor can be the same size and their bias conditions can be the same. Moreover, the drain to source voltage of the first compensation current source 210 and the second compensation current source 212 can be identical, which can minimize any mismatches in their respective drain currents due to the finite output impedances. In this way, the compensation intrinsic base current 220 can equal the intrinsic base current 224 and the compensation radiation-induced current 222 can equal the radiation-induced current 226. This can guarantee that the collector current of the respective bipolar transistor, such as, for example, the first transistor 102, is exactly the current 118, independent of the intrinsic base current 224 and the radiation-induced current 226, thereby eliminating the effect the intrinsic base current 224 and the radiation-induced current 226 on the respective bipolar transistor.

As described herein, one or more compensation circuits can be added to a bandgap reference circuit for one or more bipolar transistors of the bandgap reference circuit to eliminate the effects of both intrinsic base currents and TID induced additional effective base currents for the bandgap reference circuit at the circuit level.

Example Radiation Tolerant Bandgap References

FIG. 3 is a schematic diagram of an example radiation tolerant bandgap circuit 300 in accordance with one or more embodiments of the present disclosure. The radiation tolerant bandgap circuit 300 can include a radiation bandgap circuit such as, for example, the bandgap reference circuit 100, that is augmented with one or more compensation circuit(s). The radiation tolerant bandgap circuit 300, for example, can include a plurality of bipolar transistors and at least one compensation circuit. The at least one compensation circuit can include a first compensation circuit 305 and/or a second compensation circuit 310. Each compensation circuit can be configured to generate and provide a respective compensation base current to a base terminal of at least one bipolar transistor of the radiation tolerant bandgap circuit 300. The compensation base current can be representative of a combination of a radiation-induced current at the at least one bipolar transistor and an intrinsic base current at the at least one bipolar transistor as described herein.

The radiation tolerant bandgap circuit 300 can include a separate compensation circuit to accommodate for radiation-induced and an intrinsic base current at one or more of the plurality of bipolar transistors. Each compensation circuit can be specifically tailored to a respective transistor. For example, the size and bias conditions of a compensation transistor for each compensation circuit can be based on the size and bias conditions of a respective transistor in the radiation tolerant bandgap circuit 300.

By way of example, the radiation tolerant bandgap circuit 300 can include (i) a first transistor 315; (ii) a second transistor 320; and/or (iii) a third transistor 325. The first transistor 315 and the second transistor 320 can include diode connected NPN transistors with an emitter ratio of eight to one. In some embodiments, the radiation tolerant bandgap circuit 300 can include a separate compensation circuit that is specifically tailored to the first transistor 315 and another separate compensation circuit that is specifically tailored to the second transistor 320. For example, the radiation tolerant bandgap circuit 300 can include a first compensation circuit 305 for the first transistor 315 and a second compensation circuit 310 for the second transistor 320.

The first compensation circuit 305 can include a first compensation transistor 365 that has a first size and one or more first bias conditions that are identical to the first transistor 315. The second compensation circuit 310 can include a second compensation transistor 370 that has a second size and one or more second bias conditions that are identical to the second transistor 320.

The first compensation circuit 305 can be configured to generate and provide a first compensation base current 330 to a first base terminal of the first transistor 315. The first compensation base current 330, for example, can be representative of at least a first radiation-induced current at the first transistor 315. In some embodiments, the first compensation base current 330 can be representative of a first radiation-induced current and an intrinsic base current at the first transistor 315.

The second compensation circuit 310 can be configured to generate and provide a second compensation base current 340 to a second base terminal of the second transistor 320. The second compensation base current 340, for example, can be representative of at least a second radiation-induced current at the second transistor 320. In some embodiments, the second compensation base current 340 can be representative of a second radiation-induced current and an intrinsic base current at the second transistor 320.

The first compensation circuit 305 can be connected (e.g., electrically coupled) to the first transistor 315 by a first compensation current mirror 350. The first compensation current mirror 350 can provide a mirrored current identical to the first compensation base current 330 to the base terminal of the first transistor 315. The second compensation circuit 310 can be connected (electrically coupled) to the second transistor 320 by a second compensation current mirror 355. The second compensation current mirror 355 can provide a mirrored current identical to the second compensation base current 340 to the second base terminal of the second transistor 320.

In this manner, a TTD induced current and an intrinsic base current for the first transistor 315 can be supplied by the first compensation circuit 305 composed of the first compensation transistor 365 (denoted as Q0A), an operational amplifier (denoted as X1), and a plurality of current sources (denoted as M5 and M6) including the first compensation current mirror 350. Another compensation circuit for the current into the base terminal of second transistor 320 can be supplied by the second compensation circuit 310 composed of the second compensation transistor 370 (denoted as Q1A), an operational amplifier (denoted as X2), and a plurality of current sources (denoted as M7 and M8) including the second compensation current mirror 355.

The first compensation circuit 305 and the second compensation circuit 310 can ensure that the collector current I for both the first transistor 315 and the second transistor 320 is given by:

$$I \cdot Rpt = Vt \cdot ln[8] \tag{12}$$

It follows:

$$VGO = V_{BE2} + \frac{Rbg}{Rpt} \cdot Vt \cdot \ln[8] \tag{13}$$

The resistors symbolized by Rbg and Rpt in the above equation can be made with the same type of material which can guarantee that the ratio Rbg/Rpt is temperature independent. In this manner, the radiation tolerant bandgap circuit 300 can be realized by a PTAT current I that is radiation and base current independent.

The example radiation tolerant bandgap circuit 300 is just one of a plurality of different potential embodiments of a radiation tolerant bandgap circuit using one or more compensation circuits described herein. A person of ordinary skill in the art would understand that the compensation circuits described herein can be applied to any bandgap reference circuit to improve the accuracy and reliability of the respective circuit. For example, the radiation tolerant bandgap circuit 300 can utilize four resistors R0, R1, R2, and R3, each of which are resistors are of the same type as Rbg and are placed to keep the drain voltages of the current mirrors M0, M1, M2, M3, and M4 to be exactly the same, thereby eliminating the mismatches in these current mirrors due to the finite output impedances of them. However, other example radiation tolerant bandgap circuit 300 can utilize similar components and/or configurations to accomplish the same goal.

FIG. 4, for example, is a schematic diagram of another example radiation tolerant bandgap circuit 400 in accordance with one or more embodiments of the present disclosure. The radiation tolerant bandgap circuit 400 is another bandgap circuit employing one or more compensation circuits with a different overall circuit implementation. For example, a third transistor of a radiation tolerant bandgap circuit can be replaced with one or more resistors. A first resistor 415 (denoted as Rbg1) and a second resistor 420 (denoted as Rbg2), for example, can be utilized in place of a current source and resistor (e.g., M2, Rbg, in FIG. 3), to ensure that the final output 425 (denoted as VGO), is flat over temperature. This embodiment includes less transistors, but may use a higher supply voltage (e.g., 1.8V or higher) than the radiation tolerant bandgap circuit 300.

The final output 425 for the radiation tolerant bandgap circuit 400 can be determined by:

$$VGO = V_{BE1} + \frac{Rbga}{Rpt} \cdot Vt \cdot \ln[8] \tag{14}$$

where Rbga is the resistance of both Rbg1 and Rbg2. As shown, two compensation circuits (e.g., a first compensation circuit 405 and/or a second circuit 410) can be utilized to generate a final output 425 that is independent of TID induced currents (denoted as IR0, IR1) and intrinsic base currents (denoted IB0 and IB1). The final output 425, for example, can include the base-emitter voltage (e.g., $V_{BE1}$) and the voltage across the Rbga (e.g., which is larger than the voltage across Rpt).

Example Method of Manufacture

FIG. 5 illustrates a flowchart according to an example method 500 of manufacturing a radiation tolerant bandgap reference in accordance with one or more embodiments of the present disclosure.

At step/operation 502, the method 500 can include forming a bandgap reference circuit including a plurality of bipolar transistors. The bipolar transistors can include a first transistor and a second transistor. In some embodiments, the plurality of bipolar transistors can include a third transistor and/or any other additional transistors. The first and second transistors can include diode connected NPN transistors with an emitter ratio of eight to one.

At step/operation 504, the method 500 can include electrically coupling a first compensation circuit to the first transistor. The first compensation circuit, for example, can include a compensation transistor with the same size and bias conditions as the first transistor. The compensation transistor, for example, can include a replica of the first transistor that is placed within a proximity to the first transistor.

The first compensation circuit can be electrically coupled to the first transistor with a current mirror that is configured to generate a mirrored current that replicates a current generated by the first compensation circuit. The mirrored current can be provided to a base terminal of the first transistor to compensate for an intrinsic base current and a radiation-induced current at the first transistor.

At step/operation 506, the method 500 can include electrically coupling a second compensation circuit to the second transistor. The second compensation circuit can include a compensation transistor with the same size and bias conditions as the second transistor. The compensation transistor, for example, can include a replica of the second transistor that is placed within a proximity to the second transistor.

The second compensation circuit can be electrically coupled to the second transistor with a current mirror that is configured to generate a mirrored current that replicates a current generated by the second compensation circuit. The mirrored current can be provided to a base terminal of the second transistor to compensate for an intrinsic base current and a radiation-induced current at the second transistor.

Example Operational Amplifiers

FIG. 6 is a schematic diagram of an example compensation operational amplifier 204 in addition to the first compensation current source 210 (denoted as M5) and second compensation current source 212 (denoted as M6), in accordance with one or more embodiments of the present disclosure. The compensation operational amplifier 204, for example, can be utilized with a compensation circuit 200 to set a base-collector voltage of a compensation transistor to zero and provide a compensation base current to a base terminal of the compensation transistor that is representative of at least a radiation-induced current for a respective bipolar transistor. In some embodiments, the compensation base current is representative of both the radiation-induced current and the intrinsic base current for the respective bipolar transistor.

Alternative Compensation Circuit Without Operational Amplifiers

FIG. 7 is a schematic diagram of an alternative embodiment of an example compensation circuit 700 in accordance with one or more embodiments of the present disclosure. The compensation circuit 700, for example, can accommodate for intrinsic base current and TID induced variations in a bandgap reference circuit without an operational amplifier. The operational amplifier, for example, can be replaced with one or more transistors. The one or more transistors can include a first supply transistor 705 (e.g., denoted as M14) and a second supply transistor 710 (denoted as M15). The compensation circuit 700 can operate in a similar fashion as the compensation circuit 200.

For example, the compensation circuit 700 can include a least one diode connected NPN transistor, for example, and the compensation transistor 202. The compensation transistor 202 can be connected to a respective transistor of a bandgap reference circuit. As illustrated for example purposes, the compensation transistor 202 can be connected to the first transistor 102 of the bandgap reference circuit 100. The compensation circuit 200 can include a power supply and a plurality of equally sized current sources. The power supply can include a supply 206, the first supply transistor 705, and the second supply transistor 710. A current mirror is formed by a current to voltage converter 715 which provides a bias condition for a compensation current source 720.

The compensation transistor 202 can have a size and one or more bias conditions that are based on a respective bipolar transistor of a bandgap reference circuit. For example, the compensation transistor 202 can include a type of bipolar transistor with three layers and is controlled by a current of the compensation circuit 700. The compensation transistor 202 can be a replica of the respective bipolar transistor in terms of size and bias conditions. For example, the compensation transistor can have a compensation size that is identical to a size of the respective bipolar transistor and one or more compensation bias conditions that are identical to one or more bias conditions of the respective bipolar transistor.

In some embodiments, the compensation transistor 202 can be an exact copy of the first transistor 102. The compensation transistor 202 can be a replica of the first transistor 102 in terms of size, bias conditions, and its proximity to the first transistor 102 to mimic the first transistor 102. The compensation transistor 202 can be instantiated directly next to the first transistor 102 on a radiation tolerant bandgap reference circuit so that both the first transistor 102 and the compensation transistor 202 are exposed to the same temperature and the same radiation environment. The collector current of the compensation transistor 202 can be set to the same current 118 that is provided to the first transistor 102.

The current mirror can include the following circuit elements. A current to voltage converter 715 can provide a bias condition for a compensation current source 720. By way of example, each circuit element of the current mirror can include a transistor such as, for example, a MOSFET. In some embodiments, each circuit element of the current mirror can include a P-type MOSFET. The compensation circuit 700 can include a common gate node 214 (denoted as NPG0) for each circuit element of the current mirror.

As noted above, the power supply can include a first supply transistor 705 and a second supply transistor 710 which can be configured to set a base-collector voltage of the compensation transistor 202 close to zero and provide a compensation base current 216 to a base terminal of the compensation transistor 202 that is representative of at least a radiation-induced current 226 for a respective bipolar transistor such as, for example, the first transistor 102. In some embodiments, the compensation base current 216 is representative of both the radiation-induced current 226 and the intrinsic base current 224 for the respective bipolar transistor.

The second supply transistor 710 whose gate voltage is set by the first supply transistor 705 can provide the compensation base current 216 to the base terminal of the compensation transistor 202 through a drain of the current to voltage converter 715. For example, the first supply transistor 705 and the second supply transistor 710 in combination with the current to voltage converter 715 can provide all currents going into the base terminal of the compensation transistor 202 from the drain of the current to voltage converter 715. In this way, the first supply transistor 705 and the second supply transistor 710 can operate the current to voltage converter 715 to receive for its input the compensation base current 216.

The first supply transistor 705 and the second supply transistor 710 can force the base-collector voltage of the compensation transistor 202 to be close to zero. Accordingly, the base and collector node of the compensation transistor 202 can be very close to the same voltage, mimicking the bias condition of the first transistor 102 which has the same voltage at its collector and the base. When the loop is closed, the first supply transistor 705 and the second supply transistor 710 can drive the common gate of a first element of the current mirror (e.g., the current to voltage converter 715) and a second element of the current mirror providing a compensation current source 720 such that the drain current coming out of the compensation current source 720 is the same as the sum of the intrinsic base current 224 (denoted as IB0) and the radiation-induced current 226 (denoted as IR0) for the respective bipolar transistor (e.g., first transistor 102). In this way, the compensation base current 216 can be representative of the sum of a radiation-induced current and an intrinsic base current for a respective bipolar transistor such as, for example, the first transistor 102.

The compensation circuit 700 that is formed by the compensation transistor 202, the first supply transistor 705, the second supply transistor 710, and the first element of the current mirror operates in such a way that the drain current of the current to voltage converter 715 exactly matches the current that goes into the base of the compensation transistor 202.

The compensation circuit 700 can include a compensation current source 720 that provides a mirrored current 218 identical to the compensation base current 216 to a respective base terminal of the respective bipolar transistor (e.g., the first transistor 102) of a bandgap reference circuit. The compensation base current 216, for example, that is supplied to the base terminal of the compensation transistor 202 can be mirrored by the compensation current source 720 to generate the mirrored current 218. The mirrored current 218 can be provided into the base terminal of a respective bipolar transistor such as the first transistor 102. The compensation circuit 700, for example, can be linked (e.g., electrically coupled) to the bandgap reference circuit by the compensation current source 720 that is configured to generate the mirrored current 218 based on the compensation base current 216.

The mirrored current 218 can guarantee that a collector current of the respective bipolar transistor (e.g., first transistor 102) is independent of the intrinsic base current 224 and the radiation-induced current 226 for the respective bipolar transistor. The compensation transistor 202 and the respective bipolar transistor can be the same size and their bias conditions can be the same. Moreover, the drain to source voltage of the compensation current source 720 and the compensation current source 720 can be very close to identical, which can minimize any mismatches in their respective drain currents due to the finite output impedances. In this way, the compensation intrinsic base current 220 can equal the intrinsic base current 224 and the compensation radiation-induced current 222 can equal the radiation-induced current 226. This can guarantee that the collector current of the respective bipolar transistor, such as, for example, the first transistor 102, is exactly the current 118, independent of the intrinsic base current 224 and the radiation-induced current 226, thereby eliminating the effect the intrinsic base current 224 and the radiation-induced current 226 on the respective bipolar transistor.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

Thus, while particular embodiments of the subject matter have been described, other embodiments are within the scope of the following claims.

The invention claimed is:

1. A compensation circuit for a bandgap reference circuit, comprising:

a compensation transistor, wherein the compensation transistor has a size and one or more bias conditions that are based at least in part on a respective bipolar transistor of the bandgap reference circuit; and a compensation operational amplifier configured to:

(i) set a base-collector voltage of the compensation transistor to zero; and (ii) provide a compensation base current to a base terminal of the compensation transistor that is representative of at least a radiation-induced current for the respective bipolar transistor.

2. The compensation circuit of claim 1, wherein the compensation circuit comprises a compensation current source that provides a mirrored current identical to the compensation base current to a respective base terminal of the respective bipolar transistor of the bandgap reference circuit.

3. The compensation circuit of claim 2, wherein the mirrored current facilitates a collector current of the respective bipolar transistor that is independent of the radiation-induced current for the respective bipolar transistor.

4. The compensation circuit of claim 2, wherein the compensation circuit is electrically coupled to the bandgap reference circuit by a current mirror configured to generate the mirrored current based on the compensation base current.

5. The compensation circuit of claim 1, wherein the compensation circuit comprises a current mirror formed by a current to voltage converter and a compensation current source.

6. The compensation circuit of claim 5, wherein the current mirror comprises a plurality of p-type metal-oxide-semiconductor field-effect transistors.

7. The compensation circuit of claim 5, wherein the compensation operational amplifier provides the compensation base current to the base terminal of the compensation transistor through a drain of the current to voltage converter.

8. The compensation circuit of claim 7, wherein the compensation operational amplifier operates the current to voltage converter to control the drain of the compensation current source to output the compensation base current.

9. The compensation circuit of claim 1, wherein the compensation base current is representative of at least an intrinsic base current at the respective bipolar transistor.

10. The compensation circuit of claim 1, wherein the compensation transistor and the respective bipolar transistor are negative-positive-negative (NPN) transistors.

11. The compensation circuit of claim 1, wherein the compensation transistor has i) a compensation size that is identical to a respective size of the respective bipolar transistor and ii) one or more compensation bias conditions that are identical to one or more respective bias conditions of the respective bipolar transistor.

12. A radiation tolerant bandgap reference circuit, comprising: a plurality of bipolar transistors; and at least one compensation circuit configured to generate and provide a compensation base current to a base terminal of at least one bipolar transistor of the plurality of bipolar transistors, wherein the compensation base current is representative of at least a radiation-induced current at the at least one bipolar transistor; wherein the compensation base current is representative of a combination of the radiation-induced current at the at least one bipolar transistor and an intrinsic base current at the at least one bipolar transistor.

13. The radiation tolerant bandgap reference circuit of claim 12, wherein the plurality of bipolar transistors comprise: (i) a first transistor and (ii) a second transistor.

14. The radiation tolerant bandgap reference circuit of claim 13, wherein the first transistor and the second transistor are diode connected negative-positive-negative (NPN) transistors with an emitter ratio of eight to one.

15. The radiation tolerant bandgap reference circuit of claim 13, wherein the at least one compensation circuit comprises:

a first compensation circuit configured to generate a first compensation base current that is representative of at least a first radiation-induced current at the first transistor and provide a first mirrored current identical to the first compensation base current to a first base terminal of the first transistor; and a second compensation circuit configured to generate a second compensation base current that is representative of at least a second radiation-induced current at the second transistor and provide a second mirrored current to a second base terminal of the second transistor.

16. The radiation tolerant bandgap reference circuit of claim 15, wherein:

the first compensation circuit comprises a first compensation transistor that has a first size and one or more first bias conditions that are identical to the first transistor; and the second compensation circuit comprises a second compensation transistor that has a second size and one or more second bias conditions that are identical to the second transistor.

17. The radiation tolerant bandgap reference circuit of claim 15, wherein:

the first compensation circuit is electrically coupled to the first transistor by a first compensation current mirror, wherein the first compensation current mirror provides the first mirrored current identical to the first compensation base current to the first base terminal of the first transistor; and the second compensation circuit is electrically coupled to the second transistor by a second compensation current mirror, wherein the second compensation current mirror provides the second mirrored current identical to the second compensation base current to the second base terminal of the second transistor.

18. A method of, comprising: forming a bandgap reference circuit comprising a plurality of bipolar transistors, the plurality of bipolar transistors comprising at least a first transistor and a second transistor, wherein the first transistor and the second transistor are diode connected negative-positive-negative (NPN) transistors with an emitter ratio of eight to one; electrically coupling a first compensation circuit to the first transistor, wherein the first compensation circuit comprises a first compensation transistor with a first size and one or more first bias conditions that are identical to the first transistor; and electrically coupling a second compensation circuit to the second transistor, wherein the second compensation circuit comprises a second compensation transistor with a second size and one or more second bias conditions that are identical to the second transistor.

19. The method of claim 18, wherein:

the first compensation circuit is configured to generate and provide a first compensation base current to a first base terminal of the first transistor, wherein the first compensation base current is representative of at least a first radiation-induced current at the first transistor; and the second compensation circuit is configured to generate and provide a second compensation base current to a second base terminal of the second transistor, wherein the second compensation base current is representative of at least a second radiation-induced current at the second transistor.

* * * * *